United States Patent

Nagayasu et al.

(10) Patent No.: US 6,499,806 B2
(45) Date of Patent: Dec. 31, 2002

(54) ATTACHMENT STRUCTURE OF SPRING UNIT

(75) Inventors: Hidetaka Nagayasu, Toyota (JP); Masayuki Kato, Toyota (JP)

(73) Assignee: Araco Kabushiki Kaisha, Toyota (JP)

(*) Notice: Subject to any disclaimer, the term of this patent is extended or adjusted under 35 U.S.C. 154(b) by 11 days.

(21) Appl. No.: 09/741,813

(22) Filed: Dec. 22, 2000

(65) Prior Publication Data

US 2001/0005096 A1 Jun. 28, 2001

(30) Foreign Application Priority Data

Dec. 27, 1999 (JP) .......................... 11-370634

(51) Int. Cl.⁷ .................................... A47C 7/02
(52) U.S. Cl. .............................. 297/452.2; 297/452.18; 29/428
(58) Field of Search ................... 297/452.52, 452.49, 297/452.18, DIG. 2; 267/142, 144, 131, 133; 29/428

(56) References Cited

U.S. PATENT DOCUMENTS

| 2,581,761 A | * | 1/1952 | Haas |
| 3,035,828 A | * | 5/1962 | Stubnitz |
| 3,275,357 A | | 9/1966 | Tabor |
| 3,628,780 A | * | 12/1971 | Saito |
| 3,992,059 A | * | 11/1976 | Kloepfer |
| 4,357,005 A | * | 11/1982 | Bourke |
| 4,709,906 A | * | 12/1987 | Mizelle |
| 5,382,083 A | | 1/1995 | Fecteau et al. |
| 5,499,863 A | | 3/1996 | Nakane et al. |
| 5,601,333 A | | 2/1997 | Bostrom et al. |

FOREIGN PATENT DOCUMENTS

| DE | 42 38 549 | 5/1994 |
| FR | 1 322 287 A | 6/1963 |
| FR | 87 098 E | 9/1966 |
| GB | 1133804 A | 11/1968 |
| JP | 5-23232 | 2/1993 |
| JP | 5-70343 | 9/1993 |
| JP | 5-70344 | 9/1993 |
| JP | 5-70345 | 9/1993 |
| JP | 6-38707 | 5/1994 |
| JP | 7-303542 | 11/1995 |
| JP | 9-240341 | 9/1997 |
| JP | 11-348628 | 12/1999 |

* cited by examiner

Primary Examiner—Milton Nelson, Jr.
(74) Attorney, Agent, or Firm—Oliff & Berridge, PLC

(57) ABSTRACT

In a seat back frame formed by attaching a spring unit to a frame body, the spring unit is easily attached to the frame without performing caulking. A projecting hooked portion is formed in one side of the spring unit, and an insertion hole that receives the hooked portion therein is provided in the frame. Thus, the hooked portion is inserted into the insertion hole and hooked at a position on the rear surface thereof.

18 Claims, 4 Drawing Sheets

ATTACHMENT STRUCTURE OF SPRING UNIT

INCORPORATION BY REFERENCE

The disclosure of Japanese Patent Application No. 11-370634, filed on Dec. 27, 1999, including the specification, drawings and abstract, is incorporated herein by reference in its entirety.

BACKGROUND OF THE INVENTION

1. Field of Invention

The invention relates to an attachment structure of a spring unit in a structural component formed by attaching the spring unit to a frame body.

2. Description of Related Art

A structural component formed by attaching a spring unit to a frame body has been applied to various fields, for example, seat frames such as a frame constituting a seat cushion serving as a seating portion of a vehicle seat and an ordinary chair, and a frame forming a seat back serving as a backrest. The spring unit constituting such a structural component has a rectangular shape that is formed by a plurality of wire springs connected with each other at each intersection. The spring unit is attached to the frame body by hooking the upper and lower right and left ends of the spring unit to the corresponding frame portions of the frame body, and hooking the intermediate portion of at least one of four sides of the spring unit to a corresponding frame portion of the frame body.

Generally, the spring unit forming the structural component is attached to the frame body by caulking each hooked portion of the spring unit to the corresponding frame portion of the frame body. However, caulking is a rather troublesome operation in the case where the spring unit has many hooked portions. Moreover, in the case where the frame body is molded from an alloy as a molding material, the caulking cannot be used due to the property of the molding material.

For example, in recent years, the vehicle seats have been reduced in weight, in part by integrally molding a seat frame serving as a frame body from an alloy as the molding material, for example, a magnesium alloy and an aluminum alloy. In the case where the seat frame is used as a frame body, the caulking cannot be used due to the property of the molding material.

SUMMARY OF THE INVENTION

It is an object of the invention to enable a spring unit to be easily attached to a frame body upon forming a structural component without using the caulking to attach the spring unit to the frame body.

In order to achieve the above-stated object, an structural component of one exemplary embodiment of the invention includes a frame body having a plurality of frame portions and a spring unit composed of a plurality of wire springs connected to each other at each intersection. Each end of the spring unit is hooked to a corresponding frame portion and an intermediate portion of at least one side of the spring unit is hooked to at least one frame portion. The structural component also includes a projecting hooked portion unit provided on the side frame where the intermediate portion of at least one of four sides of the spring unit is hooked. The hooked portion is inserted into a intersection hole of the side frame and hooked at a portion on a rear surface of the side frame.

According to the structural component described above, the intermediate portion of the spring unit can be attached to the frame body by attaching a hooked portion in the intermediate portion of the spring unit to a corresponding frame portion of the frame body. This eliminates the need to use the caulking to attach the spring unit to the frame body. Accordingly, even if the caulking cannot be used due to the molding material of the frame body, the spring unit can be easily attached to the frame body. Even if the caulking can be used, the troublesome attachment operation can be eliminated, thus improving operation efficiency.

DETAILED DESCRIPTION OF PREFERRED EMBODIMENTS

Hereinafter, various exemplary embodiments of the invention will be described with reference to the drawings.

Figure 1:
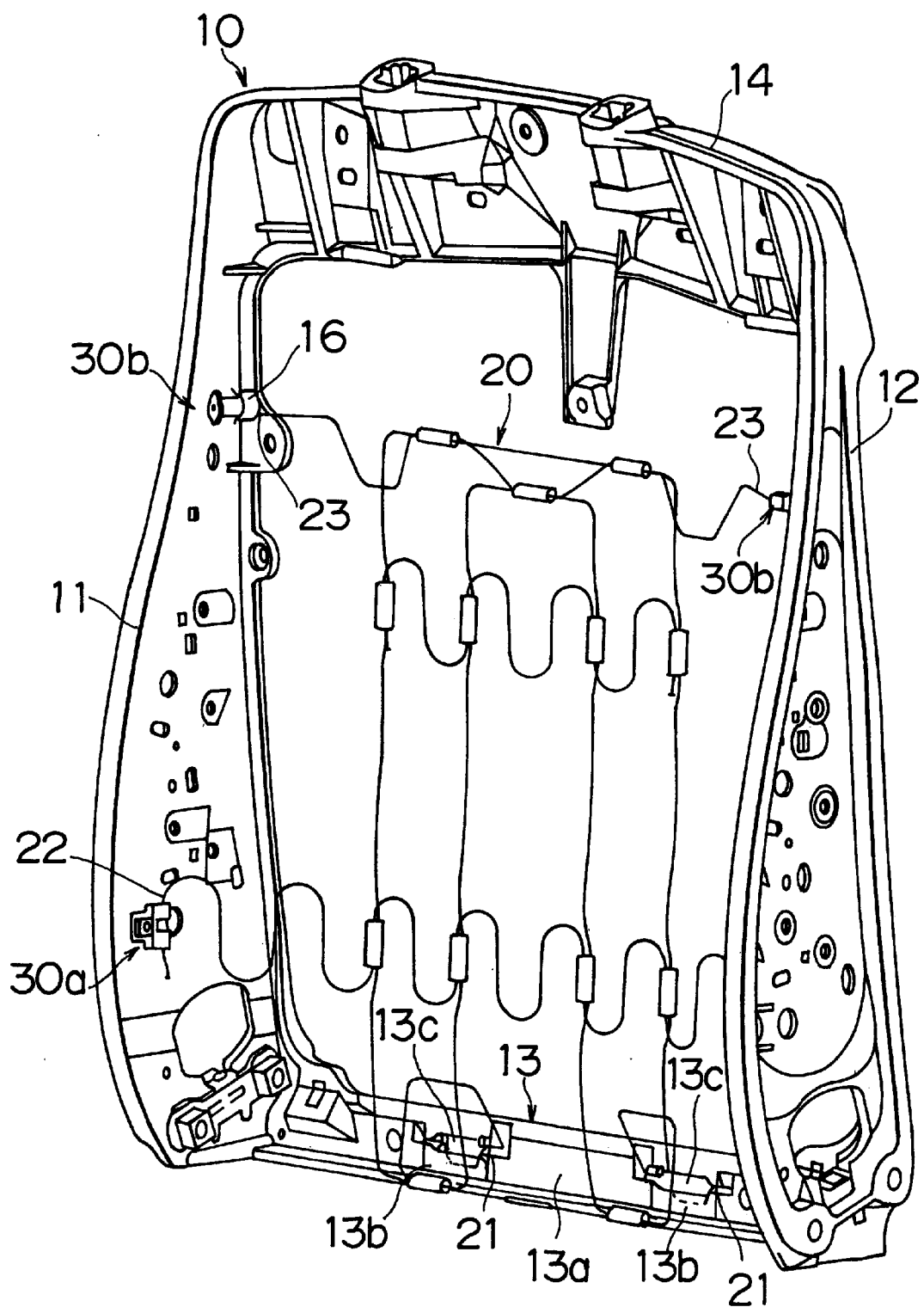
FIG. 1 is a perspective view of an exemplary embodiment of a seat back frame of a structural component to which the invention is applied.

FIG. 1 shows an example of a structural component to which the invention is applied. This structural component is a seat back frame forming a vehicle seat, and is composed of a frame 10 as a frame body, and a spring unit 20. The frame 10 is formed through integral molding from a ductile alloy, for example, a magnesium alloy and an aluminum alloy, using a metal mold casting method. For example, included as the metal mold casting method are a thixo-molding method for injection-molding a semi-molten alloy (molding material), and a die casting method. The spring unit 20 has a rectangular shape that is formed by a plurality of wire springs connected with each other at each intersection.

The frame 10 has an opening in the center, and includes a pair of left and right side frame portions 11, 12, a lower frame portion 13 connecting the respective lower portions of the side frame portions 11, 12 to each other, and an upper frame portion 14 connecting the respective upper portions of the side frame portions 11, 12 to each other. The spring unit 20 is attached to the frame 10 at the side frame portions 11, 12 and the lower frame portion 13.

A hook portion 15 is formed at two positions in the intermediate portion of the lower frame portion 13. The hook portions 15 hook respective first hooked portions 21 formed in the intermediate portion of the lower side of the spring unit 20 (see FIGS. 2 and 3). A first support bracket 30a and a second support bracket 30b are attached to each of the side frame portions 11, 12. The first support brackets 3a support respective second hooked portions 22 formed at the lower right and left ends of the spring unit 20. The second support brackets 30b support respective third hooked portions 23 formed at the upper right and left ends of the spring unit 20.

Figure 2:
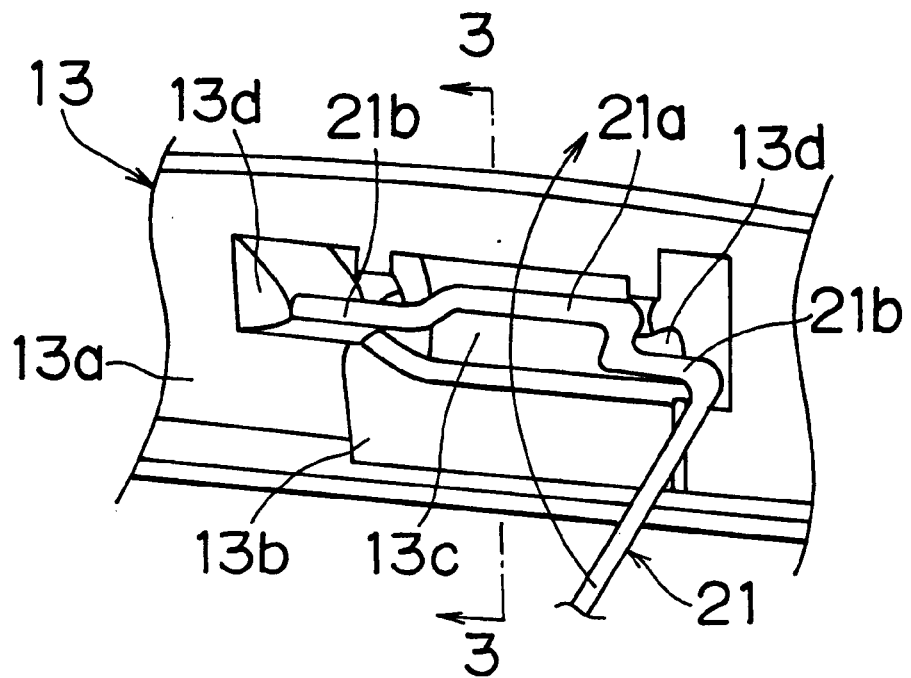
FIG. 2 is a fragmentary perspective view of a lower frame portion forming the seat back frame.
Figure 3:
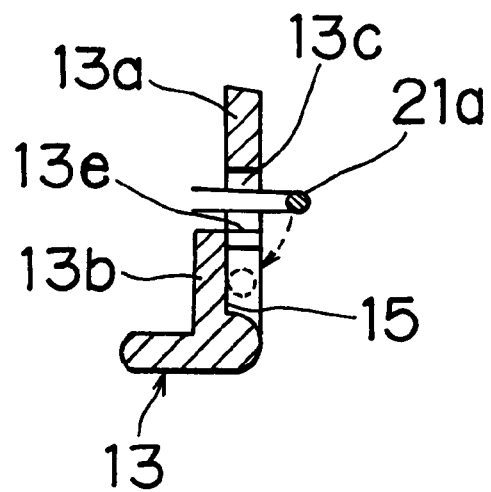
FIG. 3 is a longitudinal cross section of the lower frame portion taken along line 3—3 of FIG. 2.
Figure 4:
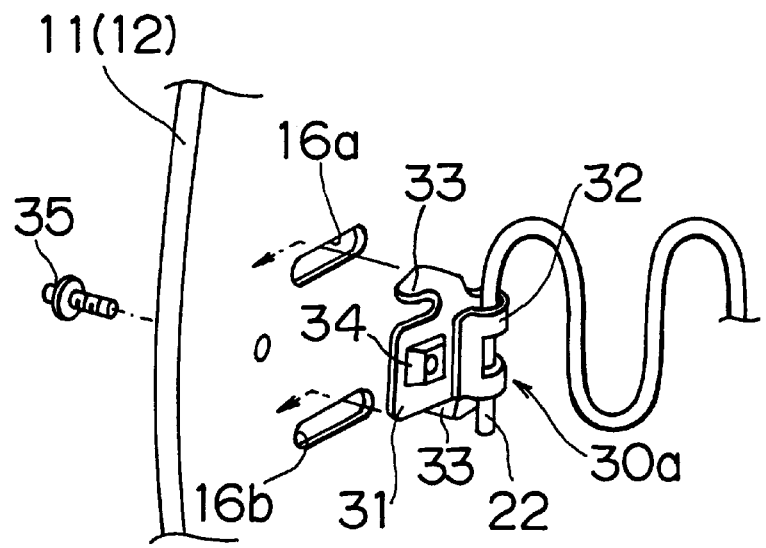
FIG. 4 is a perspective view of a first exemplary embodiment of a support bracket for attaching a part of a spring unit constituting the seat back frame.

As shown in FIGS. 1 to 3, in the spring unit 20, the first hooked portions 21 are each formed by a wire spring bent into a rectangular shape with a projecting portion 21a formed in the center of its lower end. The wire spring is bent at both ends of the projecting portion 21a so as to form engaged portions 21b. As shown in FIGS. 1 and 4, the second hooked portions 22 are the tip portions of a laterally extending wire spring. The third hooked portions 23 are the tip portions of a laterally extending wire spring, and these tip portions are each bent into an L shape so that the third hooked portions 23 each has an inserted portion 23a and a received portion 23b (see FIGS. 5 and 6).

As shown in FIGS. 2 and 3, in the lower frame portion 13 of the frame 10, each hook portion 15 is formed into a stepped shape. More specifically, each hook portion 15 has a lower wall 13b projecting forward of a base wall 13a by a predetermined amount. An insertion hole 13c is formed at the connection between the walls 13a and 13b, and the rear surface of the lower wall 13b serves as the hook portion 15 for hooking the projecting portion 21a of the corresponding first hooked portion 21 of the spring unit 20. Moreover, recesses 13d are respectively formed on the right and left sides of the insertion hole 13c, and each recess 13d serves as an engaging portion for engagingly receiving the corresponding engaged portion 21b of the first hooked portion 21. The lower wall 13b has a projecting portion 13e at its top end by a predetermined length, which projects beyond its rear surface.

As shown in FIGS. 1 and 4, each first support bracket 30a for supporting the corresponding second hooked portion 22 of the spring unit 20 is formed by a substrate 31, a first arm 32 extending from the rear edge of the substrate 31 into a circular-arc shape, and second arms 33 bent from the upper and lower rear ends of the substrate 31. A nut 34 is fixed to the side surface of the substrate 31.

The first support bracket 30a is attached to each of the side frame portions 11, 12 in the following manner. The second arms 33 are respectively inserted from the inside of the side frame portion 11, 12 into upper and lower attachment holes 16a, 16b formed in the side frame portions 11, 12, whereby the first support bracket 30a is adjusted in position in the longitudinal direction of the vehicle. Thereafter, a screw 35 is screwed into the nut 34 from the outside of the side frame portions 11, 12. The second hooked portion 22 of the spring unit 20 is inserted or caulked into the first arm 32 before or after the attachment of the first support bracket 30a to the side frame portions 11, 12. Thus, the second hooked portion 22 is supported by the first arm 32. With such a structure of the first support bracket 30a, vertical rotation of the first support bracket 30a is restricted during operation due to abutment of the second arms 33 on the side frame portions 11, 12. Moreover, horizontal rotation thereof is also restricted during operation due to abutment of the substrate 31 and the second arms 33 on the side frame portions 11, 12.

Figure 5:
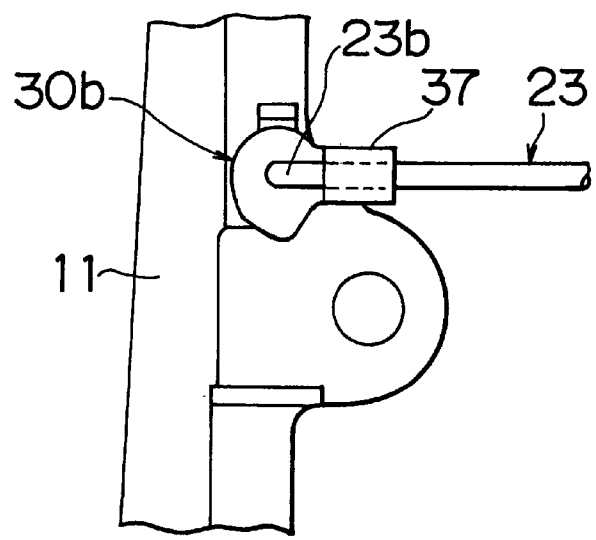
FIG. 5 is a front view of a second exemplary embodiment of a support bracket for attaching another part of the spring unit.
Figure 6A:
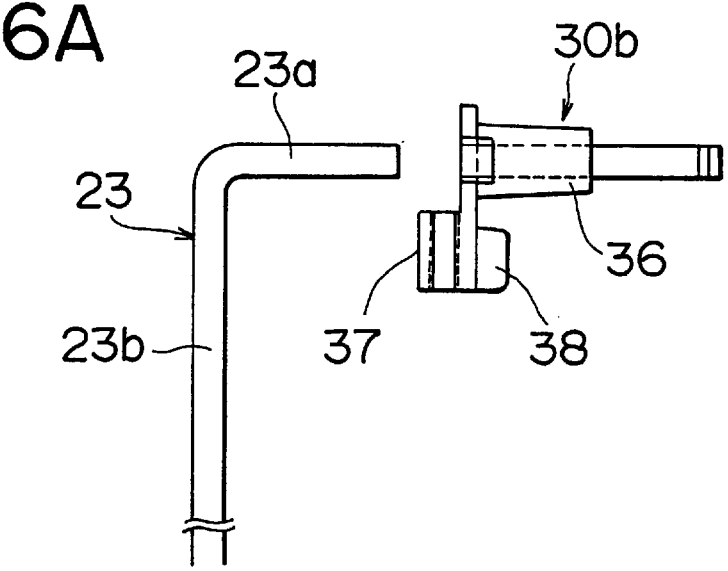
FIG. 6A is a side view of the support bracket of FIG. 5.
Figure 6B:
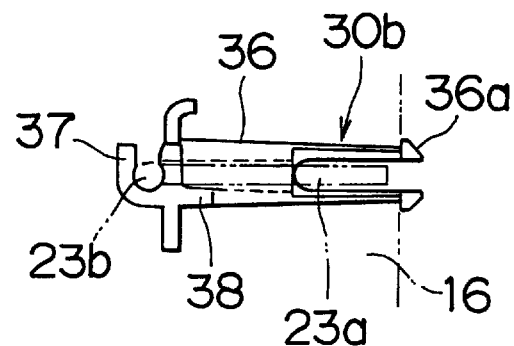
FIG. 6B is a side view of the support bracket of FIG. 6A rotated by 90 degrees.

As shown in FIGS. 5 and 6, each second support bracket 30b for supporting the corresponding third hooked portion 23 of the spring unit 20 is formed by a cylindrical support portion 36 and a receiving portion 37 extending perpendicularly from the front end thereof. An operating portion 38 is provided on the back of the receiving portion 37. The cylindrical support portion 36 is inserted into an attachment boss 16 of the side frame portions 11, 12, and is hooked at the rear surface of the boss 16 by means of a pawl 36a formed at the tip of the support portion 36. Thus, the cylindrical support portion 36 is rotatably attached to the side frame portions 11, 12 while being prevented from slipping out thereof. The second support bracket 30b is formed such that the inserted portion 23a of the third hooked portion 23 can be inserted into the cylindrical support portion 36 and the received portion 23b of the third hooked portion 23 can be received by the receiving portion 37.

The inserted portion 23a of the third hooked portion 23 of the spring unit 20 is inserted into the cylindrical support portion 36 of the second support bracket 30b attached to the side frame portions 11, 12. Thus, the inserted portion 23a is hooked to the side frame portions 11, 12 through the second support bracket 30b. The second support bracket 30b is rotated by about 90 degrees to bring the receiving portion 37 to a horizontal position. Thus, the received portion 23b is received by the receiving portion 37 and is prevented from slipping out.

Note that, as shown in FIG. 5, the second support bracket 30b has a downward projecting portion and an upward projecting piece at the front end face of the cylindrical support portion 36. Therefore, the second support bracket 30b is restricted to rotate by a predetermined amount or greater due to abutment of the projecting portion and projecting piece on the side frame portions 11, 12. Moreover, a space capable of introducing the operator's finger therein is defined by the downward projecting portion at the front end face of the cylindrical support portion 36, the receiving portion 37 and operating portion 38. Thus, attachment of the second support bracket 30b and hooking of the third hooked portion 23 can be conducted with improved efficiency.

The seat back frame is formed by attaching the spring unit 20 to the frame 10. In order to attach the spring unit 20 to the frame 10, the first brackets 30a are first attached to the respective second hooked portions 22 of the spring unit 20 by caulking at the respective first arms 32. Then, the spring unit 20 is brought to the horizontal position with respect to the frame 10, and the projecting portions 21a of the first hooked portions 21 are respectively inserted into the insertion holes 13c of the lower frame portion 13. In this state, the spring unit 20 is pivotally rotated (about the first hooked portions 21) upward (in the vertical direction) so as to be in line with the frame 10. Then, with the spring unit 20 being held in line with the frame 10, the inserted portions 23a of the third hooked portions 23 of the spring unit 20 are respectively inserted into the cylindrical support portions 36 of the second support brackets 30b. Then, by using the respective operating portions 38, the second support brackets 30b are rotated by about 90 degrees. Thus, the receiving portions 37 are brought to the horizontal position, and receive the respective received portions 23b of the third hooked portions 23. Finally, the first support brackets 30a attached to the respective second hooked portions 22 of the spring unit 20 are respectively attached to the side frame portions 11, 12.

Thus, at each of the first hooked portions 21 of the spring unit 20, the projecting portion 21a is hooked to the rear surface of the corresponding lower wall 13b of the lower frame portion 13, i.e., to the corresponding hook portion 15, and the engaged portions 21b are engaged with the respective recesses 13d of the lower frame portion 13. Therefore, the spring unit 20 is attached to the lower frame portion 13 at the first hooked portions 21. In this attached state, the projecting portions 13e formed in the lower frame portion 13 prevent the respective first hooked portions 21 from slipping out of the lower frame portion 13.

Moreover, the second hooked portions 22 of the spring unit 20 are respectively hooked to the first support brackets 30a. The third hooked portions 23 of the spring unit 20 are respectively hooked to the second support brackets 30b. More specifically, the inserted portions 23a are respectively supported by the cylindrical support portions 36 of the second support brackets 30b, and the received portions 23b are respectively received by the receiving portions 37 of the second support brackets 30b and are prevented from slipping out. Thus, the spring unit 20 is attached to the side frame portions 11, 12 at the second and third hooked portions 22, 23, respectively.

Thus, the attachment structure according to the invention eliminates the need of performing the caulking to attach the spring unit 20 to the frame 10. Accordingly, even if the caulking cannot be used due to the molding material of the frame 10, the spring unit 20 can be easily attached to the frame 10. Moreover, even if the caulking can be used, the troublesome operation can be eliminated, thus improving efficiency of the attachment operation.

Note that, in the above-described embodiment, the projecting portion 13e for hooking the first hooked portion 21 of the spring unit 20 may be omitted depending on the hooking state of the second and third hooked portions 22, 23.

Moreover, the first support bracket 30a for hooking the second hooked portion 22 of the spring unit 20 may have a single second arm 33 at the center of the rear surface of the substrate 31 so that the second arm 33 is inserted into a single attachment hole formed in each of the side frame portions 11, 12.

The second support bracket 30b for hooking the third hooked portion 23 of the spring unit 20 may be replaced with a support bracket provided with a hooking member for hooking the third hooked portion 23 in the lateral and longitudinal directions of the vehicle. In this case, the support bracket is attached to the rear surface of the side frame portion 11, 12 so that a space capable of introducing the tip portion of the corresponding third hooked portion 23 therein can be assured between the hooking member and the rear surface of the side frame portions 11, 12.

What is claimed is:

1. A structural component, comprising:
   a frame body having a plurality of frame portions;
   a spring unit composed of a plurality of wire springs forming a set of lateral springs and a set of vertical springs intersecting with each other and connected to each other at each intersection of the springs, wherein an end of selected springs is hooked to a corresponding frame portion and an intermediate portion of at least one side of the spring unit is hooked to at least one frame portion; and
   a projecting hooked portion provided on the at least one side of the spring unit which is hooked to the at least one frame portion, wherein the projecting hooked portion of the spring unit is inserted into an insertion hole of the at least one frame portion and hooked at a portion on a rear surface of the at least one frame portion.

2. A structural component according to claim 1, wherein the hooked portion is provided on a lower side of the spring unit and the insertion hole is formed in a lower frame portion of the frame body.

3. A structural component according to claim 2, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

4. A structural component according to claim 2, wherein an intermediate portion of the lower frame portion is formed into a stepped shape provided with a lower wall projecting from a base wall of the lower frame portion by a predetermined amount and the insertion hole is formed at a connection between the base wall and the lower wall of the lower frame portion, and a rear surface of the lower wall is formed as a hook portion for hooking the hooked portion of the spring unit.

5. A structural component according to claim 4, wherein the frame body includes a seat frame formed of an alloy that is integrally molded and the frame body has a pair of right and left side frame portions, an upper frame portion for connecting respective upper portions of the side frame portions -with each other, and a lower frame portion for connecting respective lower portions of the side frame portions with each other.

6. A structural component according to claim 4, wherein the hooked portion of the spring unit is inserted into the insertion hole perpendicularly to the lower frame portion and the spring unit is pivotally rotated in the vertical direction with respect to the lower frame portion.

7. A structural component according to claim 6, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

8. A structural component according to claim 1, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

9. A structural component according to claim 8, wherein the alloy is at least one of a magnesium alloy and an aluminum alloy.

10. The structure component according to claim 1, wherein the springs are mounted inside the frame body and the plurality of springs are oriented vertically and laterally within the frame.

11. A structural component according to claim 1, wherein the spring unit is provided with the hooked portion at its end, which is formed by bending a tip portion of a wire spring of the spring unit, and the frame body, in a corresponding frame portion, is provided with a support bracket for hooking the hooked portion such that the hooked portion is hooked to the corresponding frame portion through the support bracket.

12. A structural component according to claim 11, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

13. A structural component according to claim 11, wherein the support bracket is provided with a first arm for fixing the hooked portion of the spring unit, and a second arm attached to the frame body so as to allow positional adjustment.

14. A structural component according to claim 13, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

15. A structural component according to claim 11, wherein the support bracket is provided with a cylindrical support portion and a receiving portion, the cylindrical support portion having an insertion hole through which the tip portion of the hooked portion of the spring unit is inserted so as to be rotatably supported to the corresponding frame portion, and the receiving portion extending perpendicularly from a front end of the cylindrical support portion that is rotated by a predetermined amount for receiving a rear end of the hooked portion.

16. A structural component according to claim 15, wherein the frame body includes a seat frame formed of an alloy that is integrally molded and the frame body has a pair of right and left side frame portions, an upper frame portion for connecting respective upper portions of the side frame portions with each other, and a lower frame portion for connecting respective lower portions of the side frame portions with each other.

17. An attachment method of a spring unit comprising:

inserting a hooked portion of a spring unit perpendicularly into a first insertion hole of one frame portion of a frame integrally molded from an alloy;

rotating the spring unit in the vertical direction with respect to the one of the frame portion and hooking the hooked portion at a portion on a rear surface of the one frame portion;

inserting an end portion of the spring unit into a second insertion hole of another frame portion of the frame; and hooking the end portion of the spring unit to the other frame portion.

18. A structural component, comprising:

a seat back frame body integrally molded from an alloy having a plurality of frame portions;

a spring unit composed of a plurality of wire springs forming a set of lateral springs and a set of vertical springs intersecting with each other and connected to each other at each intersection of the springs, wherein an end of selected springs is hooked to a corresponding frame portion and an intermediate portion of at least one side of the spring unit is hooked to at least one frame portion; and a projecting hooked portion provided on the at least one side of the spring unit which is hooked to the at least one frame portion, wherein the projecting hooked portion of the spring unit is inserted into an insertion hole of the at least one frame portion and hooked at a portion on a rear surface of the at least one frame portion.

* * * * *